US010283995B2

(12) United States Patent
Gunderson

(10) Patent No.: US 10,283,995 B2
(45) Date of Patent: May 7, 2019

(54) CHARGE CURRENT MONITORING OR CONTROL IN A RESONANCE-TUNED INDUCTIVE CHARGER

(71) Applicant: L'Oreal, Paris (FR)

(72) Inventor: David Allen Gunderson, Everett, WA (US)

(73) Assignee: L'Oreal, Paris (FR)

( * ) Notice: Subject to any disclaimer, the term of this patent is extended or adjusted under 35 U.S.C. 154(b) by 99 days.

(21) Appl. No.: 14/194,144

(22) Filed: Feb. 28, 2014

(65) Prior Publication Data

US 2015/0249359 A1    Sep. 3, 2015

(51) Int. Cl.
| H02J 7/00 | (2006.01) |
| H02J 7/02 | (2016.01) |
| H02J 50/12 | (2016.01) |
| H02J 50/80 | (2016.01) |
| H02J 50/90 | (2016.01) |

(52) U.S. Cl.
CPC ............ *H02J 7/025* (2013.01); *H02J 7/0021* (2013.01); *H02J 7/0077* (2013.01); *H02J 50/12* (2016.02); *H02J 50/80* (2016.02); *H02J 50/90* (2016.02)

(58) Field of Classification Search
CPC .......... H02J 7/0052; H02J 50/12; H02J 7/025; H02J 5/005; H02J 17/00; H01M 10/4264; G01R 31/3658; G01R 31/00; G01R 31/36; G01R 31/3644; B60L 11/1861; B60L 11/1851
USPC .................. 320/108, 137, 104; 327/552, 558
See application file for complete search history.

(56) References Cited

U.S. PATENT DOCUMENTS

| 9,087,638 B2 | 7/2015 | Oettinger | |
| 2006/0132111 A1* | 6/2006 | Jacobs | G05F 1/618 |
| | | | 323/282 |
| 2010/0066349 A1* | 3/2010 | Lin | H02J 5/005 |
| | | | 324/103 R |

(Continued)

FOREIGN PATENT DOCUMENTS

| CN | 201656576 U | 11/2010 |
| CN | 101938151 A | 1/2011 |

(Continued)

OTHER PUBLICATIONS

International Search Report dated Jun. 9, 2015, issued in corresponding International Application No. PCT/US2015/017686, filed Feb. 26, 2015, 3 pages.

(Continued)

*Primary Examiner* — Drew A Dunn
*Assistant Examiner* — Harry O'Neill-Becerril
(74) *Attorney, Agent, or Firm* — Christensen O'Connor Johnson Kindness PLLC

(57) ABSTRACT

A battery charger and methods for magnetically transferring power from a power source to a battery is disclosed. A driver circuit outputs a modulated signal having a duty cycle from the power source to a sender-side circuit and across a space to a receiver-side tuned circuit. A sender-side sensor is configured to sense a parameter of the sender-side tuned circuit. The controller modifies the first duty cycle of the modulated signal based on the sensed parameter. A receiver-side circuit capable of determining charge status of the receiver side is also disclosed.

17 Claims, 9 Drawing Sheets

(56) References Cited

U.S. PATENT DOCUMENTS

| | | | | |
|---|---|---|---|---|
| 2010/0231173 A1* | 9/2010 | Andrea | ............... | H02M 7/797 320/137 |
| 2011/0062914 A1* | 3/2011 | Park | ............... | H02J 7/025 320/106 |
| 2013/0099807 A1* | 4/2013 | Wheeland | ............ | H04B 5/0037 324/713 |
| 2013/0260676 A1 | 10/2013 | Singh | | |
| 2013/0342027 A1* | 12/2013 | Tsai | ............... | H04B 5/0037 307/104 |
| 2015/0050881 A1* | 2/2015 | Chen | ............... | H04W 52/0296 455/41.1 |
| 2015/0162837 A1* | 6/2015 | Duan | ............... | H02M 3/337 363/21.14 |
| 2015/0303995 A1* | 10/2015 | Staring | ............... | H02J 5/005 307/104 |

FOREIGN PATENT DOCUMENTS

| | | |
|---|---|---|
| CN | 202405844 U | 8/2012 |
| EP | 2294673 A1 | 3/2011 |
| JP | 2005-237155 A | 9/2005 |
| JP | 2010-028898 A | 2/2010 |
| JP | 2010-226890 A | 10/2010 |
| JP | 2013-123237 A | 6/2013 |
| JP | 2015502131 A | 1/2015 |
| WO | 9834319 A1 | 8/1998 |
| WO | 2009/126963 A2 | 10/2009 |
| WO | 2009126963 A2 | 10/2009 |
| WO | 2010/006091 A1 | 1/2010 |

OTHER PUBLICATIONS

Written Opinion of the International Searching Authority dated Jun. 9, 2015, issued in corresponding International Application No. PCT/US2015/017686, filed Feb. 26, 2015, 5 pages.

Grajski, K., et al., "Loosely-Coupled Wireless Power Transfer: Physics, Circuits, Standards," Microwave Workshop Series on Innovative Wireless Power Transmission: Technologies, Systems, and Applications (IMWS), 2012 IEEE MTT-S International, May 2012, 7 pages.

Notification of First Office Action dated Feb. 26, 2018, issued in corresponding Chinese Application No. 201580010637.1, filed Feb. 26, 2015, 17 pages.

Office Action dated May 16, 2018, issued in corresponding European Application No. 15709034.1, filed Feb. 26, 2015, 4 pages.

Notice of Reason for Refusal dated Jun. 28, 2018, issued in corresponding Japanese Application No. JP2016-554598, filed Feb. 26, 2015, 6 pages. Includes English language translation.

\* cited by examiner

CHARGE CURRENT MONITORING OR CONTROL IN A RESONANCE-TUNED INDUCTIVE CHARGER

BACKGROUND

Inductive charging is a wireless charging technique that has increasingly been used in low-cost electronics. One inductive charging technique uses a fixed frequency and a variable duty factor PWM sender-side oscillator. Disadvantageously, this approach has required using sensed receiver-side current as feedback when controlling the sender-side PWM duty factor. Such feedback has heretofore been implemented by sensing the receiver-side charge current using a device located on the receiver side and communicating the sensed receiver-side charge current information from the receiver-side across the air gap to sender-side components. This wireless feedback mechanism between sender-side and receiver-side devices adds complexity and is costly, and therefore, it is not suitable for many low-cost electronics applications.

In addition, proper positioning of the sender-side and receiver-side devices relative to each other is important for obtaining efficient inductive power transfer between devices. Existing systems fail to test whether the positioning of the devices is impacting charging, which may cause inefficient or unreliable charging.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a battery charger for magnetically transferring power from a power source to a battery is provided. The battery charger comprises a driver circuit couplable to the power source, wherein the driver circuit is configured in some embodiments to output a modulated signal having a duty cycle with energy from the power source. The battery charger also comprises a sender-side tuned circuit magnetically couplable across a space to a receiver-side tuned circuit of a portable handheld electronic device. The sender-side tuned circuit in some embodiments is configured to have a resonant frequency near or equal to the receiver-side tuned circuit. The battery charger further includes a sender-side feedback device, such as a sensor, configured to sense a parameter of the sender-side tuned circuit, and a controller coupled to the driver circuit and to the sender-side sensor. The controller in some embodiments is configured to cause the driver circuit to output a modulated signal at a first duty cycle and at a frequency near or equal to the resonance frequency of at least one of the sender-side tuned circuit and the receiver-side tuned circuit, and to modify the first duty cycle of the modulated signal based on the sensed parameter of the sender-side tuned circuit.

In one or more embodiments of the present disclosure, the sender-side sensor may be configured to sense a voltage of the sender-side tuned circuit. The sender-side sensor in some embodiments may be configured to scale an input signal proportional to the high-side voltage so that the input signal is suitably compatible with the controller. The sender-side sensor may comprise, in a non-limiting example, a diode having a first terminal coupled to a high side of the inductor, and a second terminal of the diode may be coupled to the controller through a low pass filter.

The sender-side tuned circuit in some embodiments may include an inductor and a capacitor, and the sender-side sensor may be configured to sense a voltage of the sender-side tuned circuit on the high side of the inductor.

The controller in some embodiments may be configured to increase the duty cycle, if the sensed parameter is above a threshold value; and to decrease the duty cycle, if the sensed parameter is below the threshold value. The controller may be configured in some embodiments to enter an idle mode, if the high-side voltage of the first inductor is determined to be above a peak threshold voltage level.

In accordance with another aspect of the present disclosure, a method is provided for transferring power from a sender-side circuit to a receiver-side circuit to charge a battery on the receiver-side. The method comprises starting an energizing cycle by modulating a voltage provided by a power source through an inductor of the sender-side circuit, wherein the modulated voltage in some embodiments has a constant predetermined frequency and a first duty cycle. The method also includes determining a voltage level variable corresponding to a voltage sensed by a voltage sensor at a high-side of the sender-side inductor and comparing the determined voltage level variable to a predetermined threshold voltage level. The method in some embodiments modifies the duty cycle of the modulated voltage based on the comparison of the determined voltage level variable to the predetermined threshold voltage level.

In one or more embodiments of the present disclosure, the predetermined frequency of the modulated voltage corresponds to a resonant frequency of at least one of a sender-side circuit and a resonance frequency of the receiver-side circuit.

In various embodiments, modification of the duty cycle of the modulated voltage may include decreasing the duty cycle if the determined voltage level of the high side of the sender-side inductor is greater than the predetermined threshold voltage level and increasing the duty cycle if the determined voltage level of the high side of the sender-side inductor is less than the predetermined threshold voltage level. The modification of the duty cycle of the modulated voltage may include the following in some embodiments: setting the duty cycle to a maximum duty cycle if the determined voltage level of the high side of the sender-side inductor is greater than the maximum duty cycle and setting the duty cycle to the minimum duty cycle if the determined voltage level of the high side of the sender-side inductor is less than the minimum duty cycle.

Some non-limiting examples of the method may also determine if the sender-side circuit and the receiver-side circuit are not inductively coupled to one another using the determined voltage level at the high side of the receiver-side inductor. In addition, some non-limiting examples of the method may comprise adjusting the duty cycle to correspond to an idle mode, if the sender-side circuit and the receiver-side circuit are not inductively coupled to one another.

In accordance with another aspect of the present disclosure, a non-transitory computer readable storage medium is provided having instructions included thereon. The instructions, in response to an execution by one or more computing device, cause one or more computing devices to carry out one or more methods discussed above and/or provided herein.

In accordance with yet another aspect of the present disclosure, a receiver-side charging circuit is provided. The circuit is coupled to a portable device and is capable of determining charge status. The receiver-side charging circuit may comprise a tuned circuit having a resonance frequency and a receiver-side feedback device, such as for example a sensor, coupled to an input of a controller. In some embodiments, the sensor is configured to sense a parameter of the tuned circuit. The tuned circuit is couplable to a battery and is inductively couplable across a space to a sender-side circuit having substantially similar resonance frequency. In some embodiments, the controller is configured to cause an indication that charging is not occurring if the sensed parameter is below a threshold level.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of systems, apparatuses, and/or methods that relate to the inductive charging of a battery of a portable electronic device, such as for example, an electronic toothbrush, an electronic skin brush, and/or the like. In that regard, inductive charging generally includes a transmit or sender-side inductor in the form of a coil, sometimes referred to as the primary, spaced apart but magnetically couplable to a receiver-side inductor in the form of a coil, sometimes referred to as a secondary. Together, the primary and secondary form a transformer that provides for the transfer of energy from the sender-side to the receiver-side across the gap in order to charger a battery of an associated portable electronic device. The examples described herein illustrate techniques for controlling receiver-side charge current using feedback from a device located on the sender side.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
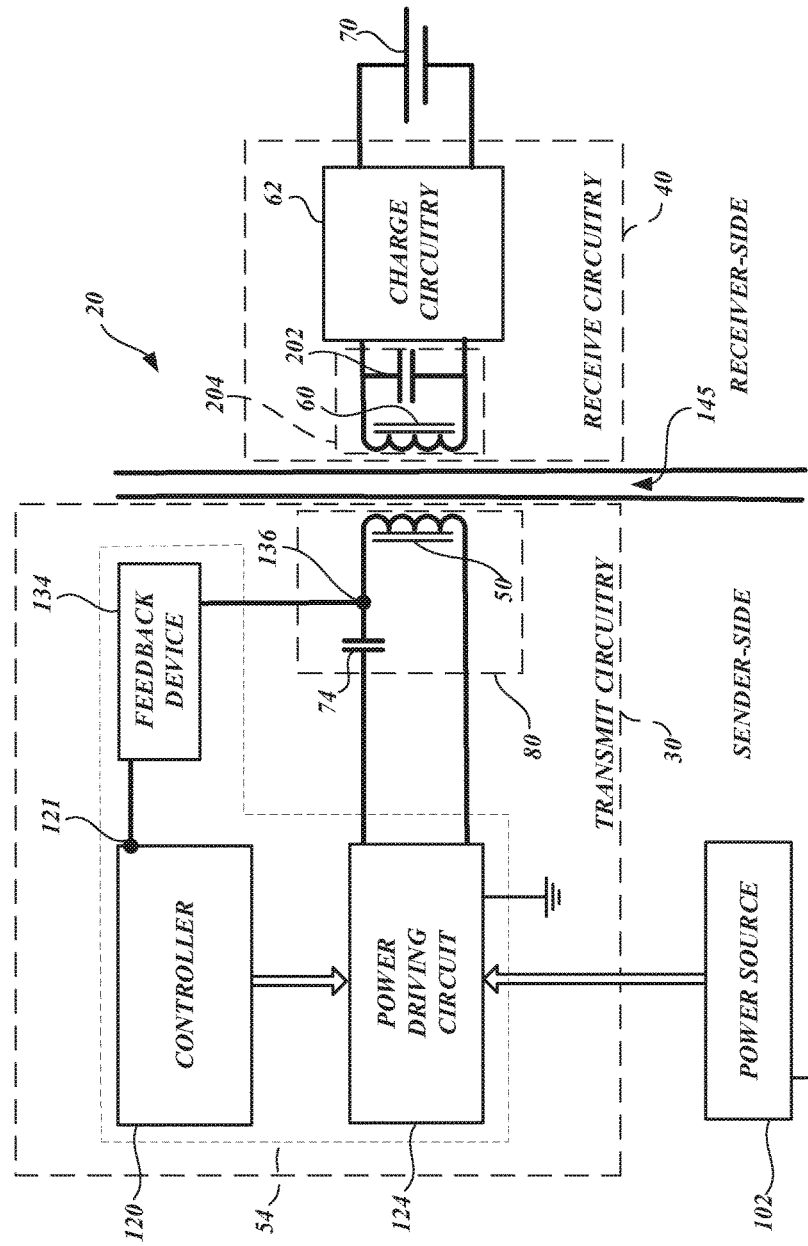
FIG. 1 is one example of a battery charging system implementing one or more aspects of the present disclosure.

Turning now to FIG. 1, there is shown one example of a battery charging system, generally designated 20, implementing one or more aspects of the present disclosure. As shown in FIG. 1, the system 20 comprises transmit circuitry 30 and receive circuitry 40 spaced apart across a space or gap 145 (e.g., air, plastic and/or other insulator or non-conductive substances). The transmit circuitry 30 includes transmit (i.e., primary) inductor coil 50 driven by transmit control circuitry 54. When driven by transmit control circuitry 54, a portion of the magnetic field responsively generated by transmit inductor coil 50 couples to receive (i.e., secondary) inductor coil 60 of the receive circuitry 40. The induced current in receive inductor coil 60 may then be utilized by charge circuitry 62 for charging a battery 70 of, for example, an associated portable electronic device. As will be described in more detail below, the transmit control circuitry 54 includes one or more components that aim to provide faster and more reliable inductive charging to the battery 70. It will be appreciated that transmit and sender-side and receive and receiver-side, respectively can be used synonymously throughout the present disclosure.

In order to drive transmit inductor coil 50, the transmit control circuitry 54 receives power from power source 102. According to various embodiments of the present disclosure, the power source 102 is configured to provide a DC voltage. In some embodiments, the DC voltage provided by power source 102 is derived from wall or "mains" power using an AC to DC converter, which may include a switching-type converter or a linear-type converter. Additionally or alternatively, the power source 102 in some embodiments includes a type A Universal Serial Bus (USB) interface. The USB interface may be inserted into a standard USB power supply, sometimes referred to as a "wall or power cube," which is configured to plug into AC "mains" power and convert such "mains" power into DC voltages and current that are compatible with the USB protocol. The USB interface may be also inserted into a standard powered USB hub or powered USB port in order to receive appropriate operating power therefrom. Representative embodiments of the power source 102 provide various voltage levels, such as between +5 and +9V, and various current levels, such as between about 0.5 and 2.5A. Other voltages and current levels may be provided by the power source 102 in embodiments of the present disclosure. It is to be understood that the DC voltage provided by power source 102 may include some amount of ripple. Additionally, the actual voltage or current provided by the power supply may also vary, commonly by up to +/−10%. Power source variations are another source of system inefficiency that may cause a higher or lower than desired charge current in the receive circuitry. As will be described in more detail below, aspects of the present disclosure can compensate for these inconsistent charge currents and allow for faster and more reliable inductive charging with less complexity than prior art battery charging systems.

Still referring to FIG. 1, the transmit control circuitry 54 comprises a controller 120, a power driving circuit 124, and a feedback device 134. The transmit control circuitry 54 may also include optional components, such as a component power source, an oscillator or clock, memory, etc. For example, a component power source may be employed to provide power to the controller 120 and other selected components. The component power source 115 may receive power from the power source 102 or from another source, such as a battery, capacitor, etc.

Figure 3:
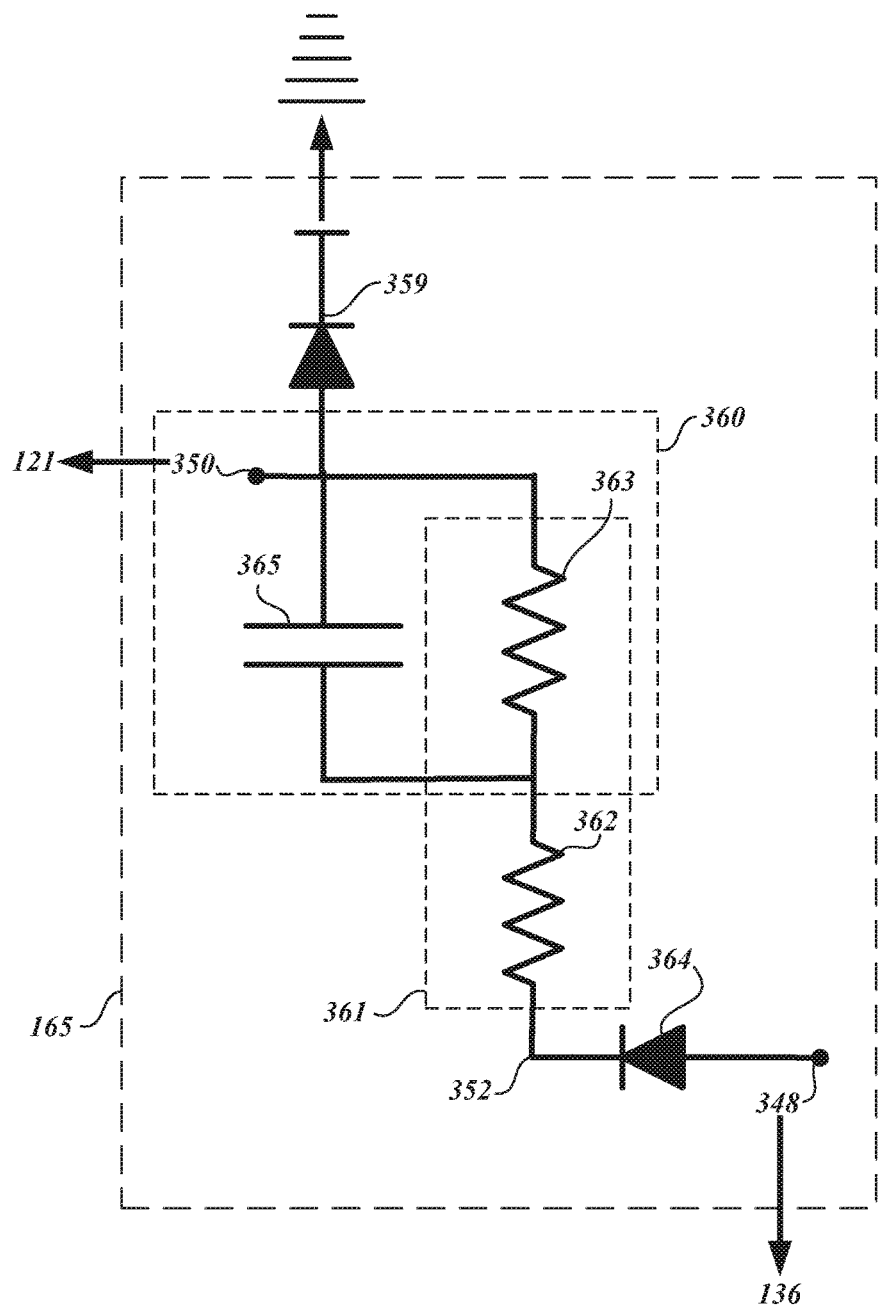
FIG. 3 is a circuit diagram illustrating a representative voltage sensor suitable for use in the sender-side or receiver-side circuitry of FIGS. 1 and 2 in accordance with one or more aspects of the present disclosure.
Figure 4:
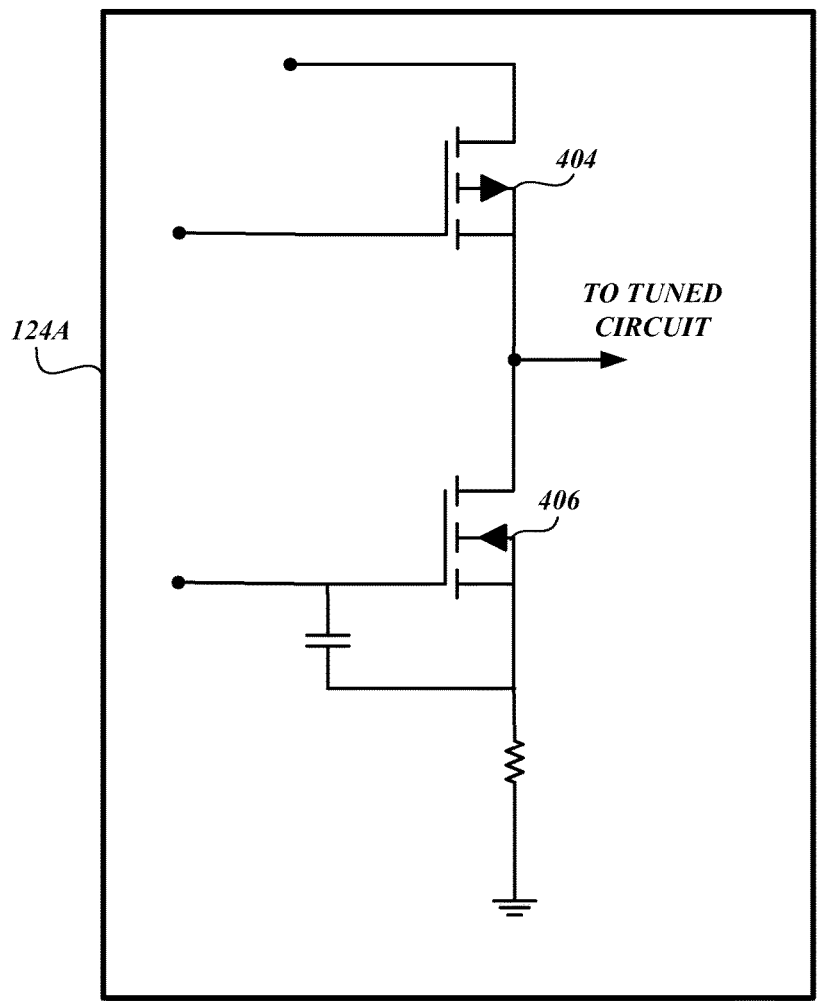
FIG. 4 is a circuit diagram illustrating a representative power driving circuit suitable for use in the transmit circuitry shown in FIG. 1 in accordance with one or more aspects of the present disclosure.

Referring now to FIGS. 1, 3, and 4, the components of the transmit control circuitry 54 will be described in more detail. The power driving circuit 124 is configured to output a modulated signal, such as a voltage, with energy from the power source 102 according to control signals issued by the controller 120. In one embodiment, the power driving circuit 124 may be, for example, a Q1 A/B dual complementary MOSFET-based device, an example of which is shown in FIG. 4. As will be described in more detail below, the frequency and duty cycle of the modulated signal can be controlled by the controller 120. In some embodiments, the frequency is fixed to a clock cycle or oscillator and the duty cycle is adjustable (e.g., it may be varied).

Power driving circuit 124 can be implemented in various configurations. In one embodiment, which is illustrated in FIG. 4, a power driving circuit 124A is implemented as a Q1 A/B dual complementary MOSFET-based device comprising a P-channel MOSFET 404 and a N-channel MOSFET 406. The drain of the P-channel MOSFET 404 is coupled the power source 102 and the source of the P-channel MOSFET 404 is coupled to the tuned circuit 80 and to the drain of the N-channel MOSFET 406. The source of the N-channel MOSFET 406 is connected to ground. The gates of both MOSFETS 404, 406 are coupled to the controller 120, which is configured to switch the MOSFETS 404, 406 off and on. In one implementation, the controller 120 is configured to turn the P-channel MOSFET 404 on and the N-channel MOSFET 406 off when injecting current into the tuned circuit 80 for the duty cycle % of the oscillator period. For the remainder of the oscillator period (non-duty cycle %), the P-channel MOSFET 404 is turned off and the N-channel MOSFET 406 is turned on to pull current out of the tuned circuit 80. Power driving circuit 124A may be embodied, for example, in an integrated circuit.

In use, the modulated voltage from the power driving circuit 124 drives the transmit inductor coil 50. In the embodiment shown, the transmit inductor coil 50 together with a capacitor 74 form a tuned circuit 80. As shown in FIG. 1, the transmit inductor coil 50 and the transmit capacitor 74 are connected in series through a node 136. It is to be understood that the transmit inductor coil 50 and the transmit capacitor 74 may use different configurations. For example, the transmit capacitor 74 and the transmit inductor coil 50 may be connected in parallel. It will be appreciated that the transmit tuned circuit 80 has a resonant frequency. The resonant frequency depends on the arrangement of the transmit inductor coil 50 and the transmit capacitor 74 with one another (e.g., parallel or series), as well as the inductance and capacitance present in the transmit circuitry 30. In certain embodiments, transmit inductor coil 50 includes an iron core inductor and capacitor 74 includes a ceramic capacitor. It will be appreciated that other types of capacitors and inductors may be used.

In accordance with aspects of the present disclosure, the inventor of the present disclosure, through analysis, circuit simulation, and prototype testing, determined that a voltage level at the high side of the transmit inductor coil 50 is proportional to the power transmitted between the sender side circuitry 30 and receiver circuitry 40. In that regard, the transmit control circuitry 54 also includes a feedback device 134 configured to sense a parameter of the transmit tuned circuit 80 and forward the sensed parameter to the controller 120 for potential modulated signal adjustment. In the embodiment shown, the feedback device 134 is configured to sense the voltage level at the high side of the transmit inductor coil 50 using a voltage sensor coupled at node 136 (high side of the of the inductor coil 50). As discussed in more detail in connection with FIG.S. 5-8, the sensed voltage level at the high side of transmit inductor coil 50 is used to control the charge current provided to the battery 70.

This feedback mechanism provides many advantages over inductive charging systems of the prior art, such as increased reliability, speed, and efficiency. The use of inductive charging systems has also been found to reduce the complexity of manufacturing hermetically sealed enclosures by eliminating the need for custom direct contact connectors to be fabricated into such an enclosure. This results in lower overall manufacturing costs and improved reliability and performance for waterproof devices.

The voltage sensor of feedback device 134 can be implemented in various configurations. In one embodiment, which is illustrated FIG. 3, a representative voltage sensor 165 is implemented as a voltage divider circuit and low pass filter. In that regard, the voltage sensor 165 includes low pass filter 360, a voltage divider 361, and a diode 364. The voltage divider 361 helps scale the voltage to downscale the sensed voltage signal to a suitable level for input to controller 120. As shown in FIG. 3, the voltage divider 361 and the low pass filter 360 share a resistor 363. The voltage sensor 165 may optionally include safety clamp 359, which helps reduce the chance of transient voltage spikes damaging electronics. Diode 364 rectifies voltage received from the transmit inductor coil 50 and low pass filter 360 helps process the rectified voltage. In the illustrated embodiment, node 348 is connected with the node 136 (shown in FIG. 1) to sense voltage at the transmit inductor coil 50. At the output from the voltage sensor 165, node 350 is connected to node 121 (shown in FIG. 1) as an input to the controller 120. In the illustrated embodiment, the diode 364 is directly connected to the transmit inductor coil 50 without any intervening components.

The term "voltage sensor" should be construed broadly to include any sensor that may be used to directly or indirectly sense a voltage level at a circuit node. It should be understood that other types of sensors may be utilized to sense a voltage level at a circuit node. Referring again to FIG. 1, the controller 120 is coupled to the power driving circuit 124 and the feedback device 134. The controller 120 is configured to cause the power driving circuit 124 to output a modulated signal to the tuned circuit 80. In representative embodiments, the modulated voltage is a pulse width modulated square wave voltage waveform having a frequency corresponding to a clock cycle generated by, for example, the controller 120. In some embodiments, the controller 120 is a Renesas 16-bit processor, such as the TSSOP-10 SMD. It will be appreciated that other types of controllers may be used. In some embodiments, the frequency of the modulated voltage corresponds to a frequency of an oscillator controlled by the controller 120. The oscillator may be integrated with or can be separate from the controller 120.

The Controller 120 is also configured to adjust the modulated voltage. In some embodiments, the modulated voltage has a fixed frequency near or equal to a resonant frequency of the transmit tuned circuit 80 and/or the transmit circuitry 30. For example, and without limitation, modulated voltage having frequencies at or near 52 KHz or 160 KHz may be utilized in the transmit tuned circuitry. It will be appreciated that other configurations of the controller 120, power driving circuit 124, and the power source 102 may be used to provide a modulated voltage using currently known or later developed technology.

Still referring to FIG. 1, the receive circuitry 40 will now be described in more detail. As shown in FIG. 1, the receive circuitry 40 comprises receive inductor coil 60 and charge circuitry 62. The receive inductor coil 60 together with a receive capacitor 202 form a receive tuned circuit 204. As described above, the charge circuitry 62 is configured to charge the battery 70 from the charge current induced in the receive inductor coil 60 through inductive coupling. In some embodiments, the receive inductor coil 60 includes an iron core inductor. It will be appreciated that other types of inductors, including various solid core inductors may be used in receive inductor coil 60. In some embodiments, the battery 70 comprises a single nickel metal hydride (NiMH) cell. In other embodiments, a battery can comprise numerous cells and/or different battery chemistry. For example, the battery 70 may include NiCad, lead-based, or lithium-based batteries, etc.

It should be noted that batteries such as NiMH and NiCad are difficult to charge accurately using current technology that does not prevent overcharge or ensure that a desired level of current is delivered to the battery. Charging rates can depend on variations in actual device component values as well as environmental conditions such as temperature, especially for NiCad and NiMH batteries. In certain embodiments, NiMH batteries are used due to more burdensome international regulations regarding the use and disposal of NiCad batteries. As discussed in more detail below, the apparatus and methods of the present disclosure can help ensure that the battery 70 is provided with a desired level of current without the need to communicate measured receiver-side information (as feedback) to sender-side components wirelessly across the gap 145.

In some embodiments of the present disclosure, receive tuned circuit 204, the charge circuitry 62, and the battery 70 are all housed in a portable electronic device. Representative portable electronic devices can include mobile phones, tablet devices, portable personal care products, such as skin cleansing devices, among others. In one embodiment, the portable electronic device is a hermetically sealed, handheld skin cleansing device. Inductive charging is particularly useful for a device that is used in damp or wet environments because it allows for device electronics to be located within a water-resistant or water proof enclosure.

Still referring to FIG. 1, the receive inductor coil 60 and the capacitor 202 are connected in parallel; however, it will be appreciated that the receive inductor coil 60 and capacitor 202 could be in series with one another. In some embodiments, capacitor 202 includes a ceramic capacitor. It will be appreciated that other types of capacitors may be used. The receive tuned circuit 204 has a resonant frequency, which is a function of the arrangement of the receive inductor coil 60 and the receive capacitor 202 with one another (e.g., parallel or series), as well as the inductance and capacitance present in the receive circuitry 40. In some embodiments, the receive tuned circuit 204 and/or the other components of the receive circuitry are configured and arranged so as to have a resonant frequency near or identical to the resonance frequency of the transmit tuned circuit 80 and/or the transmit circuitry 30.

Figure 2:
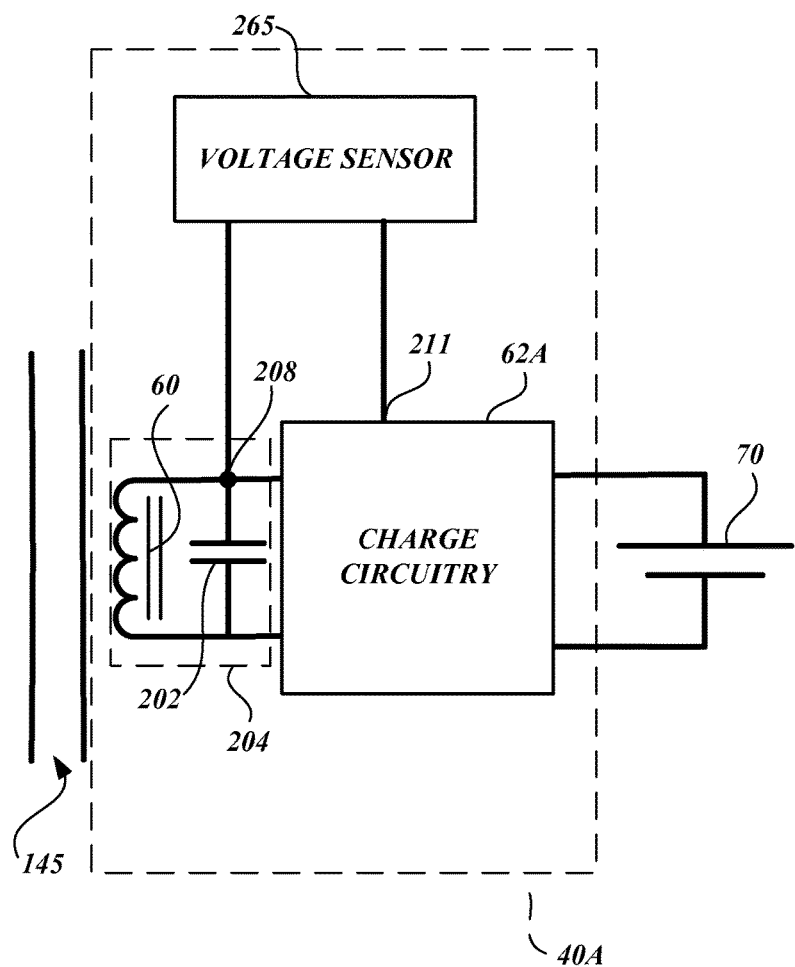
FIG. 2 is a circuit and block diagram illustrating a representative receiver-side apparatus that includes a high-side voltage sensor circuit in accordance with one or more aspects of the present disclosure.

Referring now to FIG. 2, a circuit and block diagram illustrating a representative receive circuitry, generally designated 40A, is shown. As shown in FIG. 2, a voltage sensor 265 is provided, which is coupled to the high side of the receive inductor coil 60 at node 208. As such, the voltage sensor 265 is configured to sense a high-side voltage at the receive inductor coil 60 and output such voltage to the charge circuitry 62. The receive circuitry 40A is suitable for use with the method disclosed in FIG. 9. It will be appreciated that the receive circuitry 40A may be used with the transmit circuitry 30 shown in FIG. 1. In addition, the receive circuitry 40A is compatible with other tuned transmit circuitry. A transmit circuitry does not need to include feedback device 134 to be compatible with receive circuitry 40A.

Figure 6:
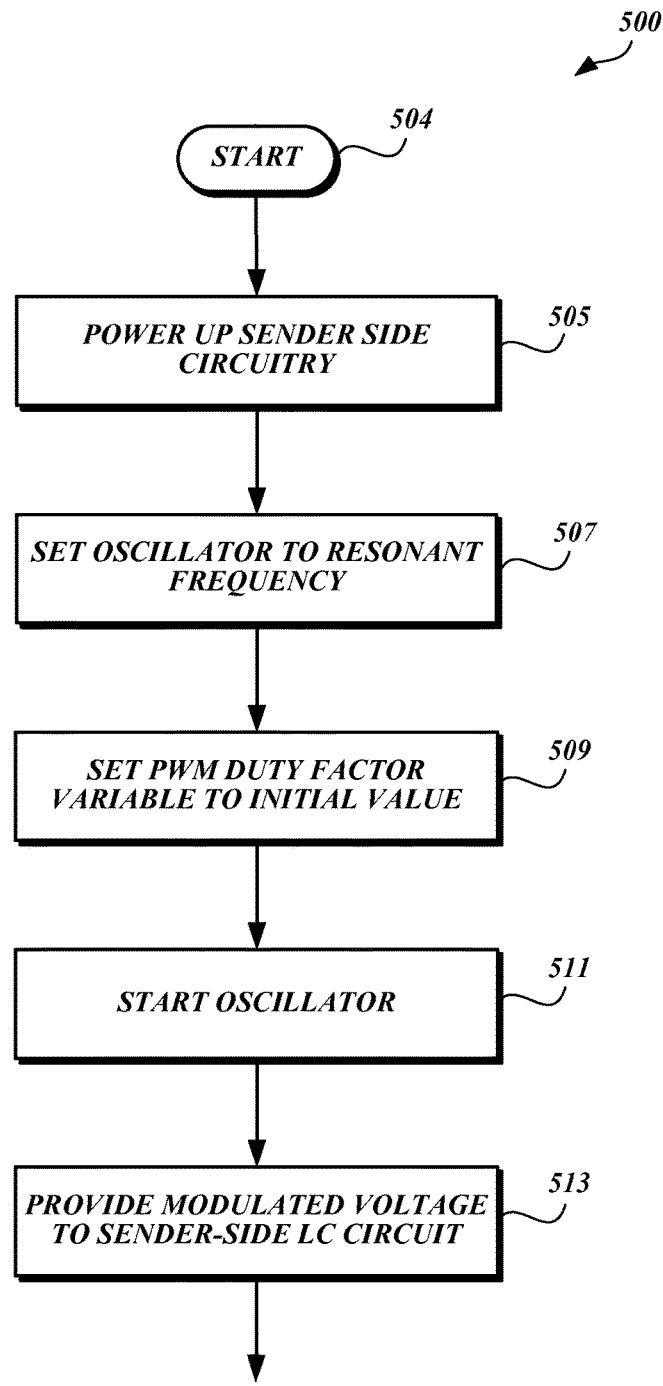
FIG. 6 is a flow diagram of a representative method for initiating sensing and control of receive circuitry charge current in accordance with one or more aspects of the present disclosure.

FIG. 6 illustrates a start-up method 500 for sender-side monitoring and adjustment of receiver-side charge current. At block 502 the method begins. At block 505, transmit circuitry 30 is powered on, which may include enabling power source 102, and/or providing power to components of the transmit control circuitry 54, such as the controller 120. In some embodiments, powering on may be performed automatically in response to a transmit circuitry 30 and a receive circuitry 40 being placed in a threshold proximity to one another or that the devices are coupled to one another. Coupling may be determining if any power is being transferred to the receive circuitry. At block 507, the transmit circuitry 30 may set the oscillator to a resonant frequency. At block 509, a PWM duty factor variable is set to an initial value. The initial value may be based on a duty factor corresponding to a desired receiver-side charge current, for example and without limitation, or it may be based on an average duty cycle saved from previously performed method 500. At block 511, the oscillator is initialized. In a representative embodiment, the oscillator frequency is 52 KHz, but it will be appreciated that other frequencies may be used. As discussed elsewhere in the disclosure, the oscillator frequency may be based on the resonant frequency of transmit tuned circuit 80, transmit circuitry 30, receive tuned circuit 204, and/or receive circuitry 40. At block 513, the modulated voltage is provided to the transmit tuned circuit 80 as discussed in connection with FIG. 1.

Figure 7:
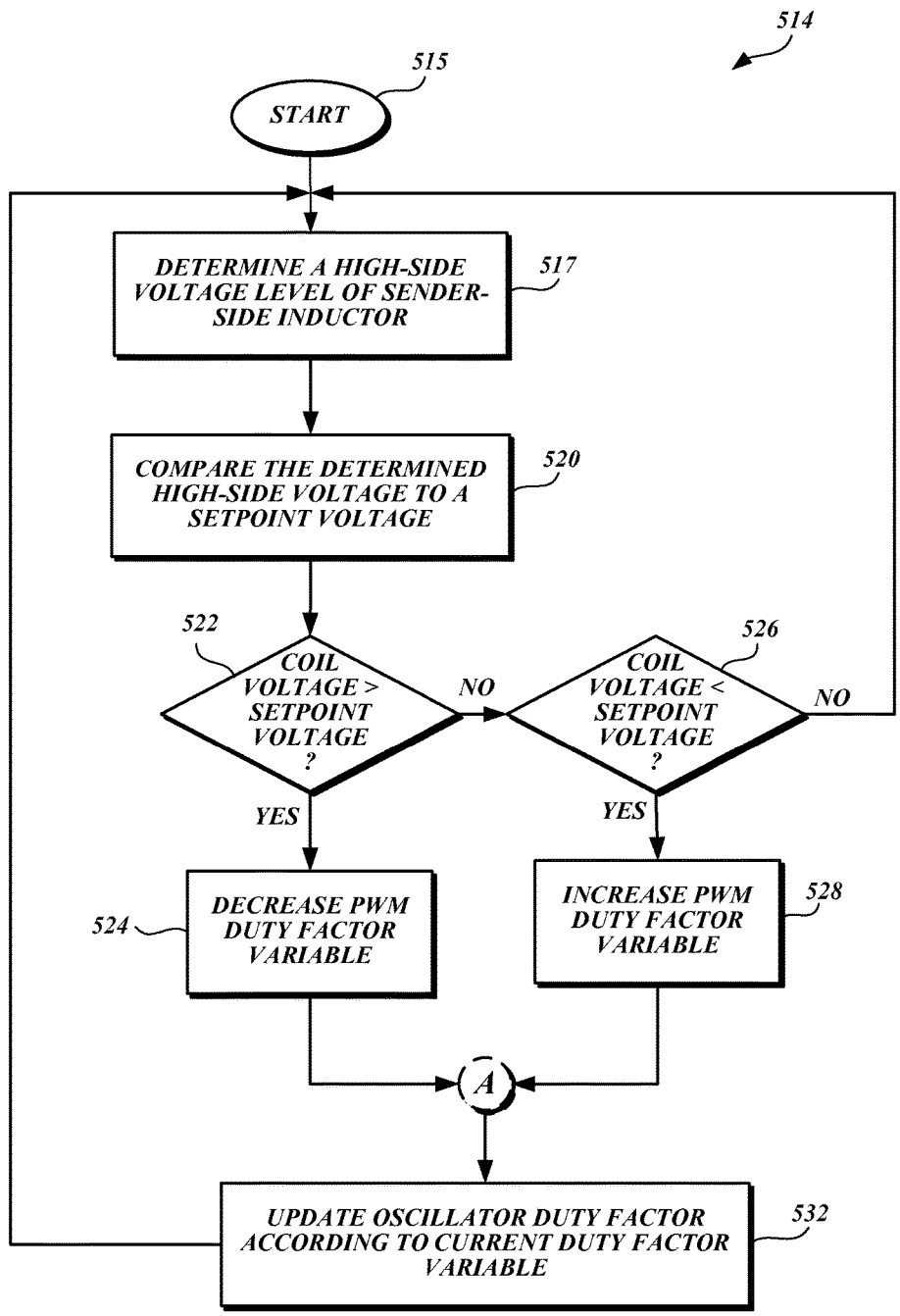
FIG. 7 is a flow diagram of a representative method for sensing and control of receive circuitry charge current in accordance with one or more aspects of the present disclosure.

FIG. 7 is one example of a method 514 for sender-side monitoring and adjustment of receiver-side charge current. In some embodiments, the method 514 occurs after one or more steps of method 500 have occurred. The method 514 begins at block 515. At block 517, a high-side voltage level of the transmit inductor coil 50 is determined. This voltage level may be determined as discussed in connection with FIG. 1, for example, such as by sampling a sensed voltage level at the node 136 using the voltage sensor 165 and inputting this sensed voltage to the controller 120. As discussed in FIG. 1, the sampled voltage may be converted from an analog to a digital signal, may be up or downscaled, filtered, or otherwise processed and/or modified before being input to the controller 120. In representative embodiments, the sensed voltage level corresponds to a peak voltage level.

At block 520, the determined high-side voltage is compared to a set point voltage stored in memory associated with controller 120. In some embodiments, the set point voltage is a predetermined value corresponding to a desired generated charge current that is matched to battery 70 at the receiver side. At block 522, a test is performed to determine if high-side voltage is greater than the set point voltage. If "yes," the duty factor variable is decreased an amount at block 524. In some embodiments, the magnitude of decrease of the duty factor variable may be a predetermined quantity. In other embodiments, the magnitude of decrease may be a function of the comparison between the determined high-side inductor voltage and the set point voltage. For example, if the determined high-side inductor voltage is 150% of the magnitude of the set point voltage, the magnitude of the decrease of the PWM duty factor variable would be greater than if the set point voltage is 110% of the magnitude of the set point voltage.

If "no" at block 522, the method 514 proceeds to block 526 where another test is performed. At block 526, if the determined transmit inductor coil voltage is less than the set point voltage, the method proceeds to block 528 where the PWM duty factor variable is increased. Similar to the decrease discussed in block 524, the magnitude of the increase at block 528 may be a predetermined amount or it may be a function of the comparison at block 520. If 'no' at block 526, the determined high-side voltage is about equal to the set point voltage. Therefore, the method 514 returns to block 517 where the high-side voltage level is again determined.

Referring now to blocks 524 and 528, the method 514 may jump to sub-method 548 at point A. In some embodiments, the jump at point A is omitted and the method 514 proceeds directly to block 532, where the PWM duty factor of the modulated voltage is modified to correspond to the current value of the duty factor variable. After block 532, the method 514 returns to block 517 where another high-side voltage level is sampled.

Figure 8:
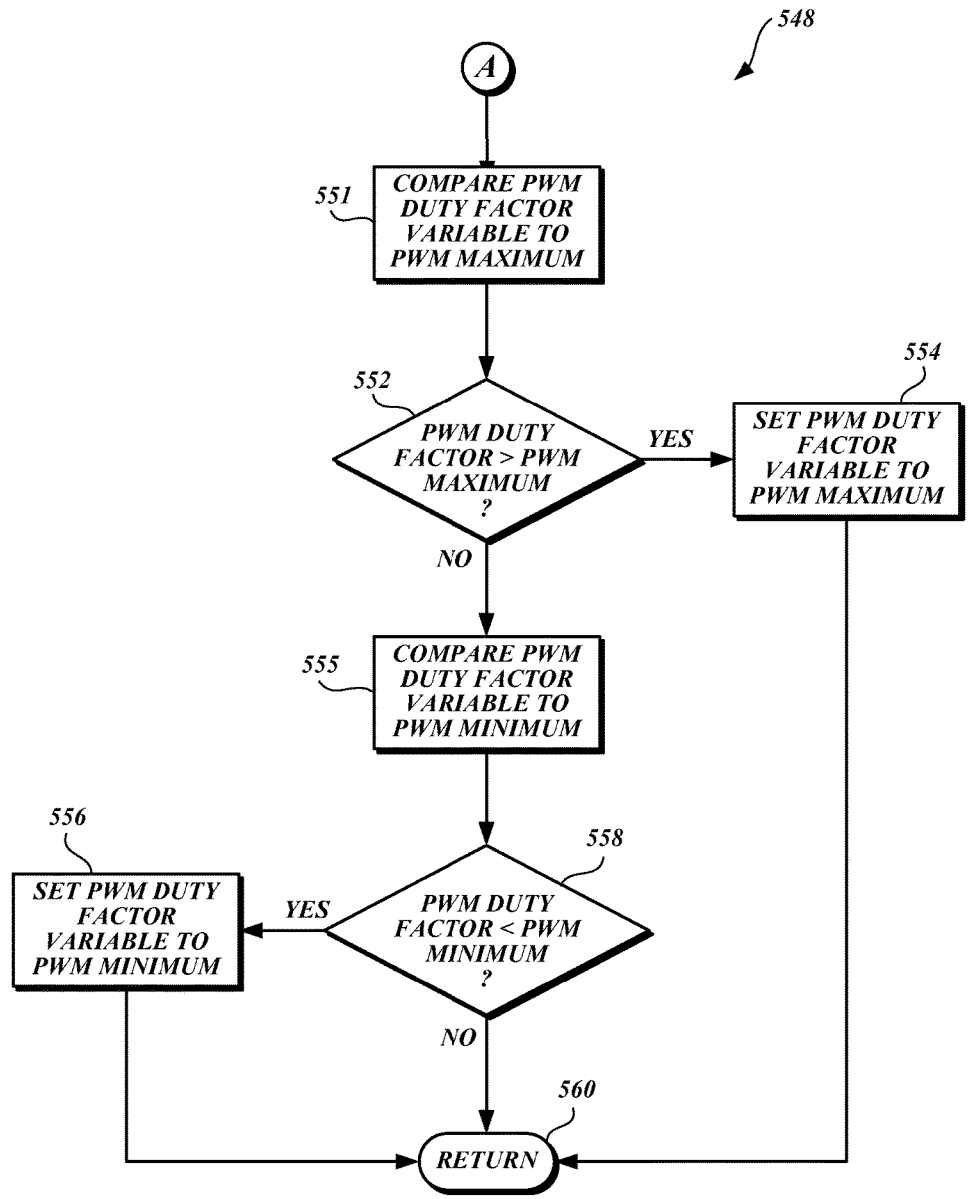
FIG. 8 is a flow diagram of a representative method for transmit circuitry sensing and control of maximum and minimum receiver circuitry charge current in accordance with one or more aspects of the present disclosure.

Referring now to FIG. 8, which illustrates an example of a method 548 for maximum and minimum PWM duty factor adjustment. Method 548 may be performed separately or as a sub-method of method 514 that begins at point A. At block 552, a test is performed. In particular, if the PWM duty factor variable is greater than a PWM maximum value, the method 548 proceeds to block 554 where the PWM duty factor variable is modified to be the PWM maximum value. Otherwise, the method 548 proceeds to block 558 where another test is performed. In particular, if the PWM duty factor variable is less than a PWM minimum value, the PWM duty factor variable is modified to be the PWM minimum value. The PWM maximum value may be a predetermined value corresponding to a safe operation or a maximum charge current for a particular receiver-side battery. The PWM minimum value may be a minimal value that is needed to periodically test if the transmit circuitry and the receive circuitry have been decoupled. The PWM minimum value may correspond to an "idle mode" that is suitable for when the transmit circuitry 30 and receive circuitry 40 are decoupled from one another or outside of threshold proximity to one another. In some embodiments, the PWM minimum corresponds to a PWM duty cycle of 20% and the PWM maximum corresponds to a PWM duty cycle of 40%; however, it will be understood that other duty cycle percentages included within the scope of the disclosure. At block 560, the method 548 returns. In some embodiments, the method 548 returns to block 532.

Figure 9:
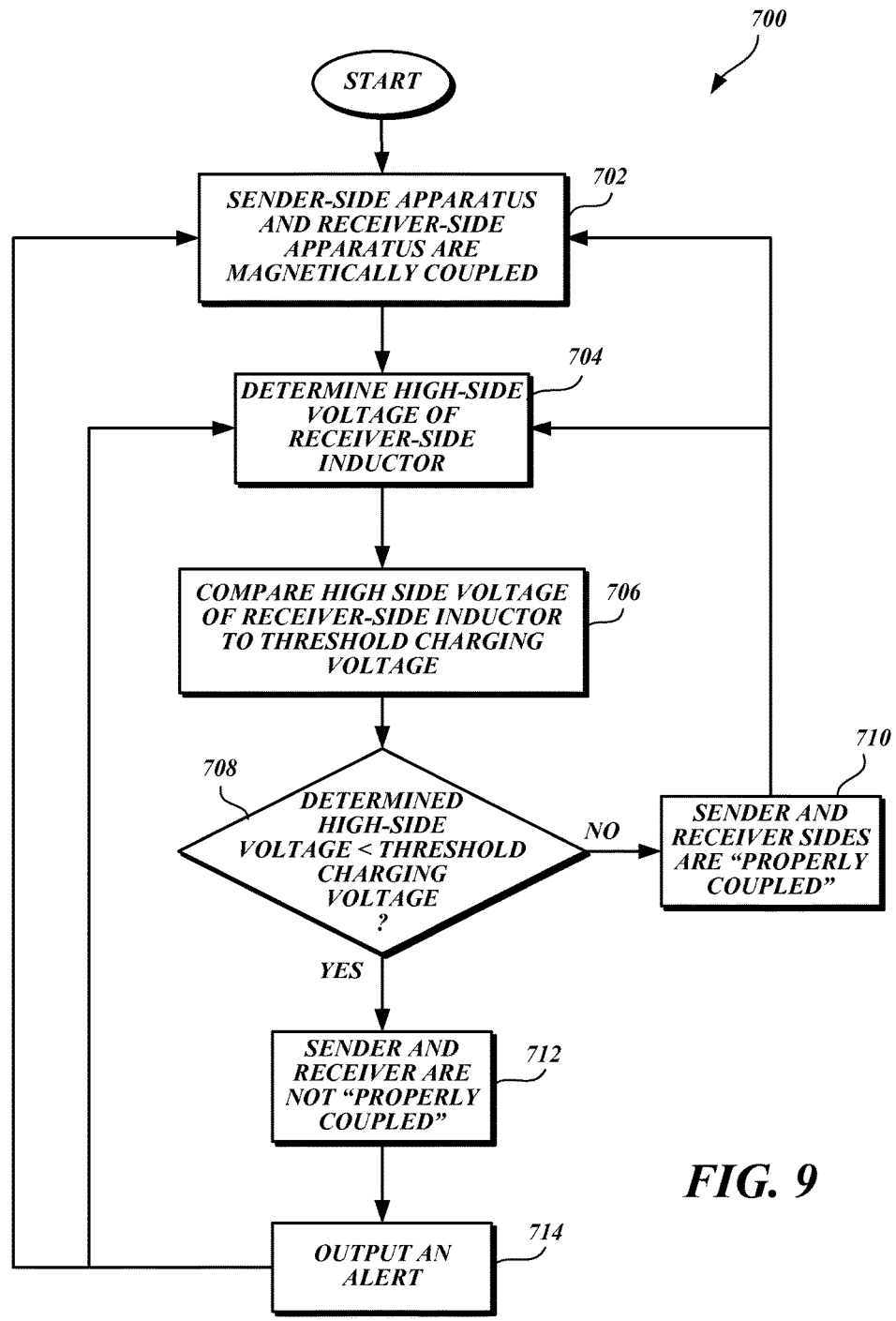
FIG. 9 is a flow diagram of a representative method for determining proper coupling between devices in accordance with one or more aspects of the present disclosure.

FIG. 9 is a flow diagram illustrating a representative method 700 for determining if the transmit circuitry 30 and receive circuitry 40 are properly coupled. Method 700 may begin at block 702 with a determination that the transmit circuitry and the receive circuitry are magnetically coupled. Various methods may be used to determine if the apparatus are coupled. It should be understood that the sender side and receiver side may be magnetically coupled to each other, but the sides not be "properly coupled" to each other. Proper coupling requires that the transmit circuitry and the receive circuitry are physically aligned or positioned with respect to one another such that the transfer of energy from the sender-side to the receiver-side occurs at a threshold efficiency. If the sender-side and the receiver-side are not "properly coupled," power may be wasted or the battery 70 may not be provided with sufficient charge current.

At block 704, the high-side voltage of the receive inductor coil 60 is determined. Such voltage may be determined, for example, by using the voltage sensor 265 on the receiver side that is shown in FIG. 2 or voltage sensor 265A shown in FIG. 4. At block 706, the determined high-side voltage of the receive inductor coil 60 is compared to a threshold charging voltage. The threshold charging voltage may be a predetermined threshold voltage level parameter that corresponds to a threshold power transfer efficiency. As discussed in connection with FIGS. 2 and 5, the high-side voltage of the receiver-side inductor coil is proportional to the charge current that is generated in the receive circuitry 40. At block 708, a test is performed to determine if the high-side voltage of the receive circuitry 40 is less than the threshold charging voltage. If "yes," the method 700 proceeds to block 712, where the method determines that the devices are not "properly coupled." If "no" at block 708, the method 700 determines that the sender side and receiver side are "properly coupled." If the sender side and receiver side are "properly coupled," the receive circuitry 40 may turn on an LED that indicates to the user that the sender side and receiver side are "properly coupled." If the sender side and the receiver side are not "properly coupled," at block 714, the receive circuitry 40 may output an alert to a user. The alert may include turning on or off one or more LEDs or outputting a sound to the user. After blocks 710 and 712, the method 700 returns to either block 702 or block 704.

Method 700 provides numerous advantages over existing methods, such as reducing power consumption. If a transmit circuitry and a receive circuitry are not physically aligned, power transfer efficiency from the sender to receiver sides may be reduced. More time may be also required to charge a battery of a receive circuitry, if the transmit circuitry and receive circuitry are not "properly coupled". Correspondingly, if the user is provided with an indication that the transmit circuitry and the receive circuitry are "properly coupled" (properly physically aligned) to each other, improved inductive charging efficiency may be realized, which provides significant advantages over the prior art.

Figure 5:
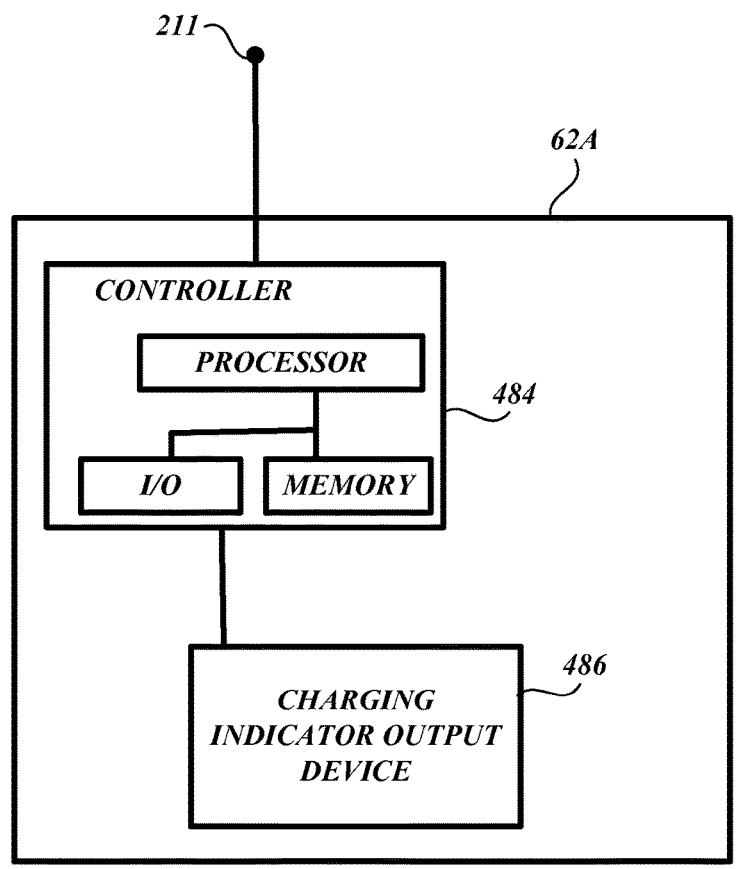
FIG. 5 is a block diagram illustrating one example of a charge detection circuit in accordance with one or more aspects of the present disclosure.

FIG. 5 illustrates a representative charge circuitry 62A that is suitable for use with method 700 or representative receive apparatus 60A. Representative charge circuitry 62A includes a controller 484 and a charging indicator output device 486. The controller 484 is coupled to a high-side 402 of the receive inductor coil (not shown). Charging indicator output device 486 may include, for example, a speaker or one or more LEDs that may be various colors. The controller 484 is configured to control charging indicator output device 486 and therefore, controller may turn LEDs off or on or output sounds. In one embodiment, the controller 484 turns off or on an LED at block 714 of method 700. The embodiments of the present disclosure provide numerous advantages. For example, the receive circuitry 40 and battery 70 are typically housed in an enclosure along with functional components of costly devices, e.g., portable handheld devices, cell phones, camera, or portable personal care products. If feedback circuitry is incorporated into the receiver side and this feedback circuitry fails, the entire device may need to be replaced, which is costly and frustrates users. Replacing sender-side electronics is usually easier and less costly than replacing the receiver-side electronics.

The "controller," such as controller 120, 484, may be any type of controller or processor, and may be embodied as one or more controllers adapted to perform the functionality discussed herein. As the term controller or processor is used herein, the controller may include use of a single integrated circuit (IC), or may include use of a plurality of integrated circuits or other components connected, arranged or grouped together, such as controllers, microprocessors, digital signal processors (DSPs), parallel processors, multiple core processors, custom ICs, application specific integrated circuits (ASICs), field programmable gate arrays (FPGAs), adaptive computing ICs, associated memory (such as RAM, DRAM, and ROM), and other ICs and components. In some embodiments, the controller may include a A/D converter in order to process the feedback signal from feedback device 134, or other components, such as clocks, oscillators, relays, buffer circuitry, etc.

As a consequence, as used herein, the term controller should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM, or $E^2$PROM. A controller (such as controller 120, 484), with its associated memory, may be adapted or configured (via programming, FPGA interconnection, or hard-wiring) to perform the methodology of the present disclosure, as discussed above. For example, the methodology may be programmed and stored, in a controller with its associated memory and other equivalent components, as a set of program instructions or other code (or equivalent configuration or other program) for subsequent execution when the processor is operative (i.e., powered on and functioning). Equivalently, while the controllers may be implemented in whole or part as FPGAs, custom ICs, and/or ASICs, the FPGAs, custom ICs, or ASICs may also be designed, configured and/or hard-wired to implement the methodology of the disclosure. For example, the controller may be implemented as an arrangement of controllers, microprocessors, DSPs, and/or ASICs, collectively referred to as a "controller," which are respectively programmed, designed, adapted, or configured to implement the methodology of the disclosure, in conjunction with the memory.

The memory, which may include a data repository (or database), may be embodied in any number of forms, including within any computer or other machine-readable data storage medium, memory device, or other storage or communication device for storage or communication of information, currently known or which becomes available in the future, including, but not limited to, a memory integrated circuit (IC), or memory portion of an integrated circuit (such as the resident memory within a controller or processor IC), whether volatile or non-volatile, whether removable or non-removable, including without limitation RAM, FLASH, DRAM, SDRAM, SRAM, MRAM, FeRAM, ROM, EPROM, or EPROM, or any other type of memory, storage medium, or data storage apparatus or circuit, which is known or which becomes known, depending upon the selected embodiment. In addition, such computer readable media includes any form of communication media which embodies computer readable instructions, data structures, program modules, or other data in a data signal or modulated signal, such as an electromagnetic or optical carrier wave or other transport mechanism, including any information delivery media, which may encode data or other information in a signal, wired or wirelessly, including electromagnetic, optical, acoustic, RF, or infrared signals, and so on. The memory may be adapted to store various look up tables, parameters, coefficients, other information and data, programs or instructions (of the software of the present disclosure), and other types of tables such as database tables.

As indicated above, the controller is programmed, using software and data structures of the disclosure, for example, to perform the methodology of the present disclosure. As a consequence, the system and methods of the present disclosure may be embodied as software which provides such programming or other instructions, such as a set of instructions and/or metadata embodied within a computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code, or metadata of the present disclosure may be embodied as any type of code, such as assembly language (machine language), C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 120, 484, for example).

The software, metadata, or other source code of the present disclosure and any resulting bit file (object code, database, or look up table) may be embodied within any tangible storage medium, such as any of the computer or other machine-readable data storage media, as computer-readable instructions, data structures, program modules or other data, such as discussed above with respect to the memory.

Furthermore, any signal arrows in the drawings/figures should be considered only representative, and not limiting, unless specifically noted otherwise. Combinations of components of steps will also be considered within the scope of the present disclosure, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. Also as used in the description herein and throughout the claims that follow, the meaning of "in" includes "in" and "on" unless the context clearly dictates otherwise.

the principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A battery charger for magnetically transferring power from a power source to a battery, the battery charger comprising:
   a driver circuit couplable to the power source, the driver circuit configured to output a modulated signal with energy from the power source, wherein the modulated signal has a duty cycle;
   a sender-side tuned circuit magnetically and wirelessly couplable across a space to a receiver-side tuned circuit of a portable handheld electronic device, wherein the sender-side tuned circuit is configured to have a resonant frequency near or equal to the receiver-side tuned circuit;
   a sender-side sensor configured to sense a voltage at a node directly connected to a high side of an inductor coil of the sender-side tuned circuit; and
   a controller coupled to the driver circuit and to the sender-side sensor, wherein the controller is configured to:
      cause the driver circuit to output a modulated signal at a first duty cycle having a first pulse width and at a frequency near or equal to the resonance frequency of at least one of the sender-side tuned circuit and the receiver-side tuned circuit, and
      modify the first pulse width of the first duty cycle of the modulated signal based on the sensed voltage of the sender-side tuned circuit,
   wherein the sender-side tuned circuit includes an inductor and a capacitor, and wherein the sender-side sensor comprises a diode having a first terminal directly coupled to a high side of the inductor without any intervening components, wherein a second terminal of the diode is coupled to the controller through a low pass filter and a voltage divider, and wherein the low pass filter and the voltage divider share a resistor.

2. The battery charger of claim 1, wherein the sender-side sensor is further configured to scale an input signal proportional to the high-side voltage so that the input signal is suitably compatible with the controller.

3. The battery charger of claim 1, wherein the controller is further configured to:
   increase the duty cycle, if the sensed voltage is above a threshold value; and
   decrease the duty cycle, if the sensed voltage is below the threshold value.

4. The battery charger of claim 1, wherein the sender-side circuit is configured to have a high-side voltage that is above a peak threshold voltage level, if the sender-side circuit and the receiver-side circuit are not inductively coupled to one another.

5. The battery charger of claim 4, wherein the controller is configured to enter an idle mode, if the high-side voltage of the inductor is determined to be above a peak threshold voltage level.

6. A method of wirelessly transferring power from a sender-side circuit to a receiver-side circuit to charge a battery on the receiver-side, the method comprising:
   starting an energizing cycle by modulating a voltage provided by a power source through an inductor of the sender-side circuit, wherein the modulated voltage has a constant predetermined frequency and a first duty cycle having a first pulse width;
   determining a voltage level variable corresponding to a voltage sensed at a high-side of an inductor coil of the sender-side circuit by a voltage sensor directly connected to a node at the high-side of the sender-side inductor;
   comparing the determined voltage level variable to a predetermined threshold voltage level; and
   modifying the first pulse width of the duty cycle of the modulated voltage based on the comparison of the determined voltage level variable to the predetermined threshold voltage level, wherein the sender-side circuit includes an inductor and a capacitor, wherein the sender-side sensor comprises a diode having a first terminal directly coupled to a high side of the inductor without any intervening components, wherein a second terminal of the diode is coupled to a controller through a low pass filter and a voltage divider, and wherein the low pass filter and the voltage divider share a resistor.

7. A non-transitory computer readable storage medium having instructions included thereon, that in response to an execution by one or more computing device, cause the one or more computing devices to carry out the method of claim 6.

8. The method of claim 6, wherein the predetermined frequency of the modulated voltage corresponds to at least one of a resonance frequency of the sender-side circuit and a resonance frequency of the receiver-side circuit.

9. A non-transitory computer readable storage medium having instructions included thereon, that in response to an execution by one or more computing device, cause the one or more computing devices to carry out the method of claim 8.

10. The method of claim 6, wherein said modifying the duty cycle of the modulated voltage includes:
    decreasing the first pulse width of the duty cycle if the determined voltage level of the high side of the sender-side inductor is greater than the predetermined threshold voltage level; and
    increasing the first pulse width of the duty cycle if the determined voltage level of the high side of the sender-side inductor is less than the predetermined threshold voltage level.

11. The method of claim 10, wherein said modifying the duty cycle of the modulated voltage further includes:
    setting the first pulse width of the duty cycle to a maximum duty cycle if the determined voltage level of the high side of the sender-side inductor is greater than the maximum duty cycle; and
    setting the first pulse width of the duty cycle to the minimum duty cycle if the determined voltage level of the high side of the sender-side inductor is less than the minimum duty cycle.

12. A non-transitory computer readable storage medium having instructions included thereon, that in response to an execution by one or more computing device, cause the one or more computing devices to carry out the method of claim 10.

13. A non-transitory computer readable storage medium having instructions included thereon, that in response to an execution by one or more computing device, cause the one or more computing devices to carry out the method of claim 11.

14. The method of claim 6, further comprising determining if the sender-side circuit and the receiver-side circuit are not inductively coupled to one another using the determined voltage level at the high side of the receiver-side inductor.

15. The method of claim 14, further comprising adjusting the duty cycle to correspond to an idle mode, if the sender-side circuit and the receiver-side circuit are not inductively coupled to one another.

16. A non-transitory computer readable storage medium having instructions included thereon, that in response to an execution by one or more computing device, cause the one or more computing devices to carry out the method of claim 14.

17. A non-transitory computer readable storage medium having instructions included thereon, that in response to an execution by one or more computing device, cause the one or more computing devices to carry out the method of claim 15.

* * * * *